(12) United States Patent
Kiyama et al.

(10) Patent No.: US 9,256,090 B2
(45) Date of Patent: Feb. 9, 2016

(54) DISPLAY DEVICE, ELECTRONIC APPARATUS, AND METHOD FOR MANUFACTURING DISPLAY DEVICE

(71) Applicant: Japan Display Inc., Tokyo (JP)

(72) Inventors: Takuya Kiyama, Tokyo (JP); Daisuke Sumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 143 days.

(21) Appl. No.: 14/204,664

(22) Filed: Mar. 11, 2014

(65) Prior Publication Data

US 2014/0267988 A1    Sep. 18, 2014

(30) Foreign Application Priority Data

Mar. 12, 2013 (JP) ................... 2013-049626
Mar. 7, 2014 (JP) ................... 2014-044624

(51) Int. Cl.
  *G02F 1/1333*    (2006.01)
  *G02F 1/1345*    (2006.01)
  *C03B 33/07*     (2006.01)
  *H04N 13/04*     (2006.01)

(52) U.S. Cl.
  CPC .............. *G02F 1/1333* (2013.01); *C03B 33/07* (2013.01); *G02F 1/13452* (2013.01); *H04N 13/0409* (2013.01); *G02F 2001/133368* (2013.01); *G02F 2001/133388* (2013.01); *H04N 2013/0463* (2013.01); *Y10T 225/12* (2015.04)

(58) Field of Classification Search
  CPC . G02F 1/13452; G02F 1/1345; G02F 1/1333; G02F 1/133305
  See application file for complete search history.

(56) References Cited

FOREIGN PATENT DOCUMENTS

JP    2009-237279    10/2009

*Primary Examiner* — Phu Vu
(74) *Attorney, Agent, or Firm* — Michael Best & Friedrich LLP

(57) ABSTRACT

According to an aspect, a display device includes a first substrate, a second substrate, and light shielding layer. The first substrate is a plate-like member and is provided with a switching element for each of pixels arranged in a matrix and a wiring coupled to the switching element. The second substrate is a plate-like member facing the first substrate and having a smaller thickness than the thickness of the first substrate. The second substrate has an outer edge that faces a portion of the first substrate to which the wiring is not led out and that is positioned inside an outer edge of the first substrate when viewed from a direction orthogonal to a substrate surface of the first substrate.

5 Claims, 15 Drawing Sheets

DISPLAY DEVICE, ELECTRONIC APPARATUS, AND METHOD FOR MANUFACTURING DISPLAY DEVICE

CROSS-REFERENCE TO RELATED APPLICATIONS

This application claims priority from Japanese Application No. 2013-049626, filed on Mar. 12, 2013, and Japanese Application No. 2014-044624, filed on Mar. 7, 2014, the contents of which are incorporated by reference herein in its entirety.

BACKGROUND

1. Technical Field

The present disclosure relates to a display device, an electronic apparatus, and a method for manufacturing the display device.

2. Description of the Related Art

In recent years, there has been an increasing demand for display devices provided to mobile devices, such as mobile phones and electronic paper. Some types of display devices are known, including liquid-crystal display devices provided with a liquid crystal sandwiched between two substrates, for example. Liquid-crystal display devices are typically manufactured by forming a plurality of liquid-crystal display panels on a large substrate and dividing the large substrate into a plurality of liquid-crystal display panels. Japanese Patent Application Laid-open Publication No. 2009-237279 (JP-A-2009-237279), for example, discloses a liquid-crystal panel including a first substrate, a second substrate, and a sealing material. The first substrate includes a display surface that displays an image. The second substrate is arranged in a manner facing the surface of the first substrate opposite to the display surface. The sealing material is arranged in a manner surrounding an area corresponding to the display surface between the first substrate and the second substrate and sandwiches a liquid crystal in the area. The end surface of the second substrate is formed by: forming a cut flaw serving as a starting point of division on the surface facing the first substrate when the second substrate is cut out into a predetermined shape from a mother substrate from which the second substrate is obtained; and applying a stress thereto.

In recent years, there have been developed two-screen display model liquid-crystal display devices capable of displaying images in respective different directions. Such a model is, for example, arranged at the center of a dashboard of a car to allow a person in the driver's seat and a person in the passenger's seat to view respective images. In two-screen display models, a substrate on which a color filter is formed is small in thickness. As a result, a portion obtained by dividing the substrate on which the color filter is formed may possibly protrude outside a circuit board because of an influence of fluctuations in scribing, for example. If this portion comes into contact with a jig or the like in a manufacturing process of the liquid-crystal display device, cracking or chipping may possibly occur.

For the foregoing reasons, there is a need for preventing cracking or chipping of a substrate on the color filter side included in a display device.

SUMMARY

According to an aspect, a display device includes a first substrate, a second substrate, and light shielding layer. The first substrate is a plate-like member and is provided with a switching element for each of pixels arranged in a matrix and a wiring coupled to the switching element. The second substrate is a plate-like member facing the first substrate and having a smaller thickness than the thickness of the first substrate. The second substrate has an outer edge that faces a portion of the first substrate to which the wiring is not led out and that is positioned inside an outer edge of the first substrate when viewed from a direction orthogonal to a substrate surface of the first substrate. The light shielding layer is provided to a surface of the second substrate opposite to the first substrate and divides an image displayed by the pixels by blocking a part of light from the second substrate.

According to another aspect, a method for manufacturing a display device includes: forming cuts for separating a plurality of display panel units from a display panel group in which the display panel units are formed on a first substrate and a second substrate facing the first substrate and having a thickness of one-twentieth to one-fifth of the thickness of the first substrate; and dividing the display panel group along the first and the second cuts. The forming cuts includes forming first cuts at two positions sandwiching a position corresponding to an outer edge of the display panel on a surface of the second substrate, and forming a second cut between the first cuts adjacent to each other on a surface of the first substrate in plan view.

DETAILED DESCRIPTION

Figure 1:
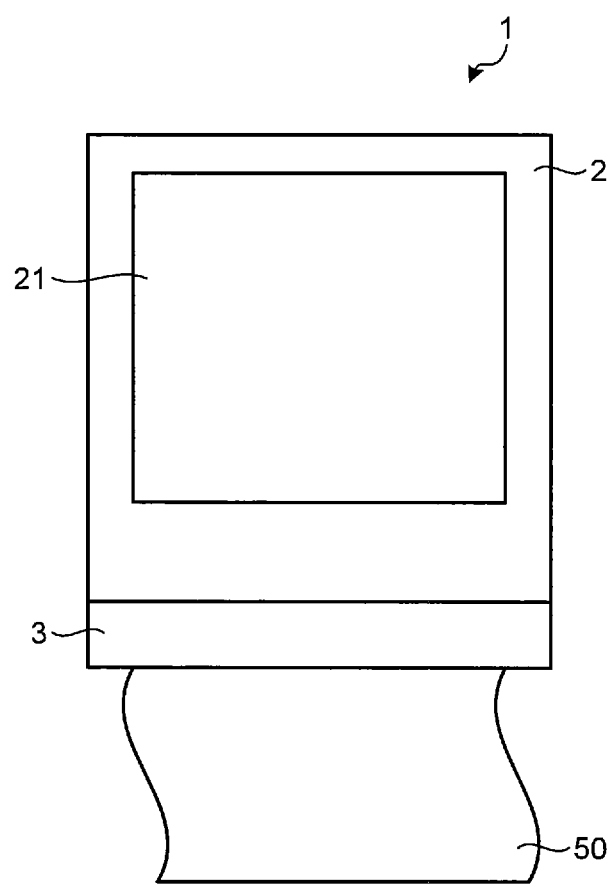
FIG. 1 is a diagram of an example of a display device according to an embodiment.

Some embodiments for embodying the present disclosure (hereinafter, referred to as "embodiments") are described below in detail with reference to the accompanying drawings in the following order:

1. Display device
1-1. Overall configuration
1-2. Two-screen display
1-3. Relation between a counter substrate and a pixel substrate
1-4. Method for manufacturing the display device
2. Electronic apparatuses
3. Aspects of the present disclosure 1. Display Device 1-1. Overall Configuration FIG. 1 is a diagram of an example of a display device according to an embodiment. FIG. 1 schematically illustrates a display device 1, and the sizes and the shapes therein are not necessarily the same as the actual sizes and shapes.

The display device 1 includes at least a display panel 2 having a display area 21. In the present embodiment, the display device 1 further includes a driver integrated circuit (IC) 3 and flexible printed circuits (FPC) 50. The FPC 50 transmits an external signal to the driver IC 3 or drive electric power to drive the driver IC 3. The display area 21 is formed of a number of pixels (sub-pixels) including a liquid crystal and arranged in a matrix (in rows and columns) to display an image. As described above, the display device 1 is a liquid-crystal display device.

Figure 2:
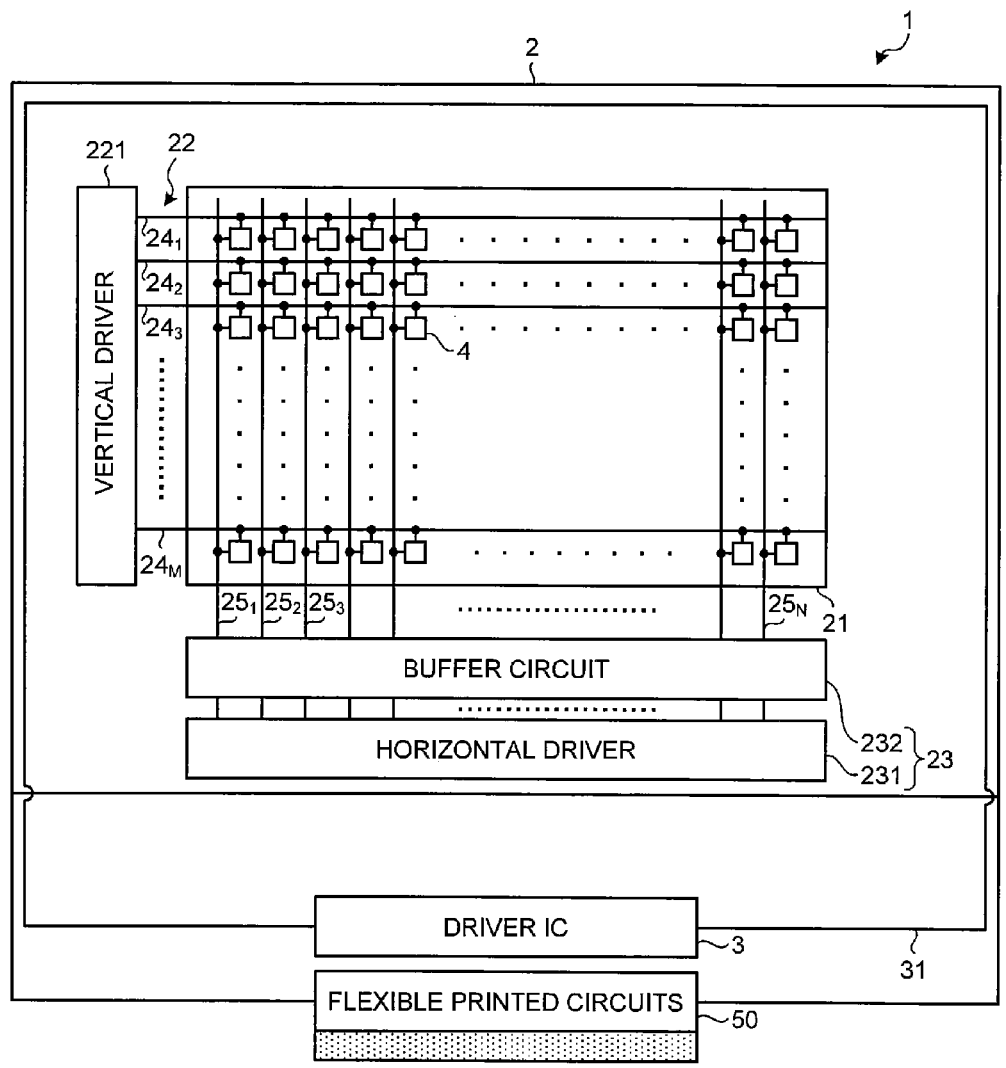
FIG. 2 is a diagram of an exemplary system configuration of the display device illustrated in FIG. 1.

FIG. 2 is a diagram of an exemplary system configuration of the display device illustrated in FIG. 1. The display panel 2 includes the display area 21, the driver IC 3, a vertical drive circuit 22, and a horizontal driver circuit 23 on the surface of a translucent substrate. The driver IC 3 has a function of an interface (I/F) and a timing generator. The vertical drive circuit 22 includes a vertical driver 221. The horizontal drive circuit 23 includes a horizontal driver 231 and a buffer circuit 232. In the case where an amorphous silicon thin film transistor (TFT) is used as a switching element in the display area 21 of the display device 1, for example, the horizontal driver 231 is formed of an IC and is bonded to the surface of glass (a translucent substrate). In the case where the display device 1 is a small high-definition panel, the circuit of the vertical driver 221 is frequently formed of TFTs. In the display device 1, the driver IC 3 and at least one of the horizontal driver 231 and the vertical driver 221 may be formed in a single IC.

The display area 21 has a matrix (row and column) structure in which pixels 4 including a liquid-crystal layer, which will be described later, are arranged in M-rows and N-columns. Both M and N are natural numbers. The row represents a pixel row having N pixels 4 arrayed in a direction. The column represents a pixel column having M pixels 4 arrayed in a direction orthogonal to the direction in which the pixels 4 included in the row are arranged. In the display area 21, scanning lines (gate lines) $24_1, 24_2, 24_3, \ldots, 24_M$ are arranged as wirings of respective rows in the array of M-rows and N-columns of the pixels 4, whereas signal lines $25_1, 25_2, 25_3, \ldots, \ldots, 25_N$ are arranged as wirings of respective columns. In the present embodiment, the scanning lines $24_1, 24_2, 24_3, \ldots, 24_M$ may be hereinafter referred to as a scanning line 24 when not being distinguished from one another, whereas the signal lines $25_1, 25_2, 25_3, \ldots, \ldots, 25_N$ may be referred to as a signal line 25 when not being distinguished from one another.

The display panel 2 receives a master clock, a horizontal synchronizing signal, and a vertical synchronizing signal serving as external signals from the outside and transmits the signals to the driver IC 3. The driver IC 3 converts the levels of the master clock, the horizontal synchronizing signal, and the vertical synchronizing signal at a voltage amplitude of an external power source of the display device 1 into the level of a voltage amplitude required to drive the liquid crystal. The driver IC 3 then transfers the master clock, the horizontal synchronizing signal, and the vertical synchronizing signal to a timing generator, thereby generating a vertical start pulse, a vertical clock pulse, a horizontal start pulse, and a horizontal clock pulse.

The driver IC 3 supplies the vertical start pulse and the vertical clock pulse to the vertical drive circuit 22 and supplies the horizontal start pulse and the horizontal clock pulse to the horizontal drive circuit 23. The driver IC 3 generates a common potential (a counter electrode potential) commonly supplied to pixel electrodes of the respective pixels 4, a control pulse of the same phase as that of the common potential, and a control pulse of a phase opposite to the common potential. The driver IC 3 then supplies the common potential and the control pulses to the display area 21. Specifically, the driver IC 3 is coupled to a common wiring 31 and supplies the common potential to the common wiring 31. The common wiring 31 is arranged along the outer edge of the display panel 2 to surround an area in which the display area 21, the vertical driver circuit 22, and the horizontal drive circuit 23 are arranged.

The vertical drive circuit 22 is arranged in a manner sandwiching the display area 21. The vertical drive circuit 22 may be arranged on one side of the display area 21. The vertical drive circuit 22 includes a shift register, the vertical driver 221, etc. The vertical drive circuit 22 receives the vertical start pulse described above, thereby starting scanning. The vertical drive circuit 22 outputs a scanning signal to the scanning lines in order from the top or from the bottom in synchronization with the vertical clock pulse. Thus, the vertical drive circuit 22 turns ON the switching elements (TFTs) of the pixels 4 coupled to the scanning lines, thereby allowing a pixel voltage to be written to the pixels 4.

The horizontal drive circuit 23 is supplied with 6-bit digital image data of R (red), G (green), and B (blue), for example. The horizontal drive circuit 23 writes display data in the pixels 4 of the row selected by vertical scanning performed by the vertical drive circuit 22 for each pixel, a plurality of pixels, or all the pixels simultaneously via the signal lines $25_1$, $25_2$, $25_3$, ..., $25_N$. The following describes an exemplary configuration of the display area 21 in detail.

Figure 3:
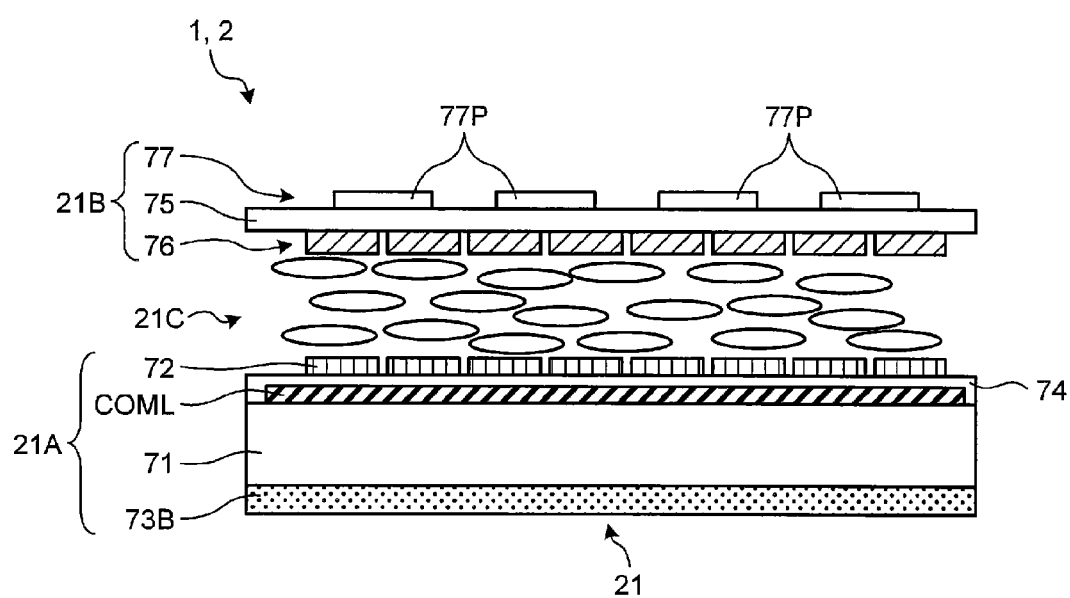
FIG. 3 is a sectional view of a schematic sectional configuration of the display device according to the embodiment.
Figure 4:
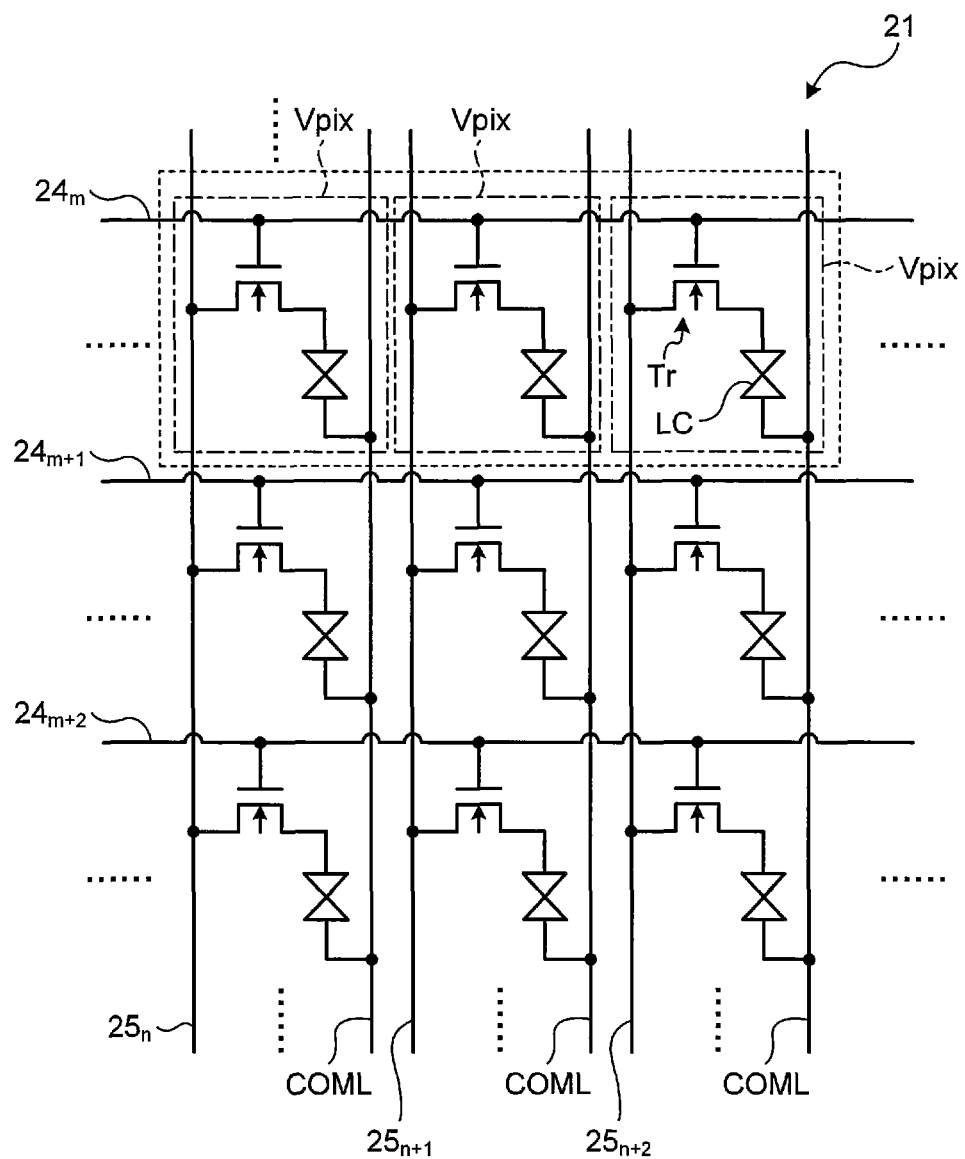
FIG. 4 is a circuit diagram of a pixel array of the display device according to the embodiment.

FIG. 3 is a sectional view of a schematic sectional configuration of the display device according to the embodiment. FIG. 4 is a circuit diagram of a pixel array of the display device according to the embodiment. As illustrated in FIG. 3, the display area 21 of the display panel 2 provided to the display device 1 includes a pixel substrate 21A, a counter substrate 21B, and a layer of a liquid crystal (hereinafter, appropriately referred to a liquid-crystal layer) 21C. The counter substrate 21B is arranged in a manner facing the surface of the pixel substrate 21A in a perpendicular direction thereto. The liquid-crystal layer 21C is interposed between the pixel substrate 21A and the counter substrate 21B.

The liquid-crystal layer 21C modulates light passing therethrough depending on the state of an electric field. A liquid crystal in various types of modes, including twisted nematic (TN) mode, vertical alignment (VA) mode, electrically controlled birefringence (ECB) mode, a fringe field switching (FFS) mode, or the like can be used to the liquid-crystal layer 21C. Orientation films may be provided between the liquid-crystal layer 21O and the pixel substrate 21A and between the liquid-crystal layer 21C and the counter substrate 21B illustrated in FIG. 3, respectively.

The counter substrate 21B includes a glass substrate 75 serving as a second substrate and a color filter 76 formed on a first surface of the glass substrate 75. The glass substrate 75 is a plate-like member. The glass substrate 75 has a smaller thickness than that of a TFT substrate 71 of the pixel substrate 21A, which will be described later. A light shielding layer 77 including light shielding patterns 77P is arranged on a second surface of the glass substrate 75. The color filter 76 includes color areas colored in three colors of red (R), green (G), and blue (B). In the color filter 76, the color areas of the color filter colored in three colors of red (R), green (G), and blue (B) are periodically arrayed, for example. The color areas of the three colors of R, G, and B are associated, as a group, with each pixel Vpix illustrated in FIG. 4 as the pixel 4 illustrated in FIG. 2. The color filter 76 faces the liquid-crystal layer 21C in a direction perpendicular to the glass substrate 75 or the TFT substrate 71. The color filter 76 may be formed of a combination of other colors when it is colored in different colors. Typically, the luminance of the color area of green (G) is higher than the luminance of the color area of red (R) and the color area of blue (B) in the color filter 76.

The pixel substrate 21A includes the TFT substrate 71, a plurality of pixel electrodes 72, a common electrode COML, an insulating layer 74, and a polarizing plate 73B. The TFT substrate 71 serves as a first substrate (a circuit board). The pixel electrodes 72 are arranged in a matrix on the TFT substrate 71. The common electrode COML is formed between the TFT substrate 71 and the pixel electrodes 72. The insulating layer 74 electrically insulates the pixel electrodes 72 from the common electrode COML. The polarizing plate 73B on which light is incident is arranged on the lower surface of the TFT substrate 71. The TFT substrate 71 is a plate-like member having a larger thickness than that of the glass substrate 75 of the counter substrate 21B. The TFT substrate 71 is made of glass, for example.

The TFT substrate 71 is provided with TFT elements Tr and wirings, such as signal lines $25_n$, $25_{n+1}$, and $25_{n+2}$ and scanning lines $24_m$, $24_{m+1}$, and $24_{m+2}$, for example. The TFT elements Tr serve as switching elements of the respective pixels Vpix illustrated in FIG. 4. The signal lines $25_n$, $25_{n+1}$, and $25_{n+2}$ supply pixel signals to the pixel electrodes 72. The scanning lines $24_m$, $24_{m+1}$, and $24_{m+2}$ supply scanning signals to the TFT elements Tr. The signal lines $25_n$, $25_{n+1}$, and $25_{n+2}$ extend on a plane parallel to the surface of the TFT substrate 71 and supply pixel signals to display an image to the pixels Vpix. The signal lines $25_n$, $25_{n+1}$, and $25_{n+2}$ are not coupled to GND and in a floating state.

The display area 21 illustrated in FIG. 4 includes a plurality of pixels Vpix arranged in a matrix. The pixels Vpix each include the pixel electrode 72, the TFT element Tr and a liquid-crystal element LC. In this example, the TFT element Tr is an n-channel metal oxide semiconductor (MOS) TFT. One of the source and the drain of the TFT element Tr is coupled to the signal line 25, the gate is coupled to the scanning line 24, and the other of the source and the drain is coupled to the pixel electrode 72. An electric field generated by the pixel electrode 72 and the common electrode COML aligns the liquid crystal element LC in a direction along the electric field. The common electrode COML is a translucent electrode made of a translucent conductive material (a translucent oxide), such as an indium tin oxide (ITO).

The pixel Vpix is coupled to other pixels Vpix belonging to the same row in the display area 21 by one of the scanning lines $24_m$, $24_{m+1}$, and $24_{m+2}$. The scanning lines $24_m$, $24_{m+1}$, and $24_{m+2}$ are coupled to the vertical driver 221 and are supplied with scanning signals from the vertical driver 221. Thus, the vertical driver 221 applies the scanning signals to the scanning lines $24_m$, $24_{m+1}$, and $24_{m+2}$ in a scanning direction. The pixel Vpix is also coupled to other pixels Vpix belonging to the same column in the display area 21 by one of the signal lines $25_n$, $25_{n+1}$, and $25_{n+2}$. The signal lines $25_n$, $25_{n+1}$ and $25_{n+2}$ are coupled to the horizontal driver 231 and are supplied with pixel signals from the horizontal driver 231. The pixel Vpix is further coupled to the other pixels Vpix belonging to the same column in the display area 21 by the common electrode COML. The common electrode COML is coupled to the driver IC 3 via the common wiring 31 and is supplied with the common potential from the driver IC 3.

The vertical driver 221 illustrated in FIG. 2 applies scanning signals to the gates of the TFT elements Tr of the pixels Vpix via the signal lines $25_n$, $25_{n+1}$, and $25_{n+2}$ illustrated in FIG. 4. Thus, the vertical driver 221 sequentially selects a row (a horizontal line) out of the pixels Vpix arranged in a matrix in the display area 21 as a target of display drive. The horizontal driver 231 illustrated in FIG. 2 supplies pixel signals to the pixels Vpix included in a horizontal line sequentially selected by vertical driver 221 via the signal lines $25_n$, $25_{n+1}$ and $25_{n+2}$ illustrated in FIG. 4. These pixels Vpix perform display of a horizontal line based on the pixel signals thus supplied. The driver IC 3 applies the common potential.

As described above, the display device 1 drives the vertical driver (gate driver) 221 so as to scan the scanning lines $24_m$, $24_{m+1}$, and $24_{m+2}$ sequentially, thereby selecting a horizontal line sequentially. The display device 1 causes the horizontal driver 231 to supply the pixel signals to the pixels Vpix belonging to the horizontal line, thereby performing display of the horizontal line.

In the display device 1, continuous application of a direct-current (DC) voltage of the same polarity to the liquid-crystal element LC may possibly reduce durability, such as resistivity (substance-specific resistance) of the liquid crystal. To prevent deterioration of the resistivity (substance-specific resistance) and the like in the liquid crystal, the display device 1 employs a driving method for inverting the polarity of the pixel signal at a predetermined period with respect to the common potential of the drive signal.

Some types of driving methods for the display panel are known, including line inversion, dot inversion, and frame inversion driving methods. The line inversion driving method is a driving method for inverting the polarity of the pixel signal at a time period of 1H (H represents a horizontal period) corresponding to one line (one pixel row). The dot inversion driving method is a driving method for alternately inverting the polarity of the pixel signal for pixels vertically or horizontally adjacent to each other. The frame inversion driving method is a driving method for inverting the polarity of the pixel signal to be written to all the pixels in one frame corresponding to one screen with the same polarity at a time. The display device 1 can employ any one of the driving methods described above.

1-2. Two-Screen Display

Figure 5:
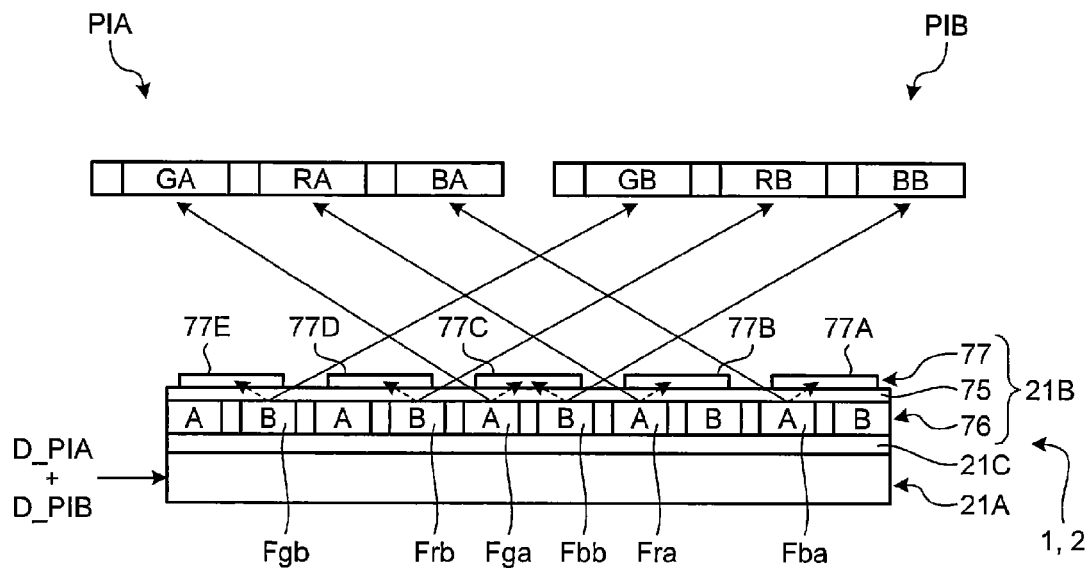
FIG. 5 is a diagram of a state where the display device according to the embodiment is displaying an image.

FIG. 5 is a diagram of a state where the display device according to the embodiment is displaying an image. The display panel 2 of the display device 1 displays an image PIA and an image PIB in different directions, specifically, the right direction and the left direction, for example. The display panel 2 of the display device 1 has a function of what is called two-screen display. The display device 1 is, for example, arranged on a dashboard of a car to allow a person in the driver's seat and a person in the passenger's seat to view the image PIA and the image PIB, respectively.

The display panel 2 is provided with the light shielding layer 77 on the surface of the counter substrate 21B on the side opposite to the pixel substrate 21A. More specifically, the light shielding layer 77 is formed on the second surface of the glass substrate 75. The light shielding layer 77 blocks a part of light passing through the counter substrate 21B, more specifically, the color filter 76 and the glass substrate 75 after passing through the pixel substrate 21A and the liquid-crystal layer 21C. As a result, an image created by the pixels of the pixel substrate 21A is divided in different directions. This makes it possible to view the image PIA and the image PIB in the different directions. The light shielding layer 77 includes light shielding patterns 77A to 77E. The light shielding patterns 77A to 77E are metal thin films, for example. The light shielding layer 77 is not necessarily formed by using the light shielding patterns 77A to 77E.

Parts of light passing through a color filter Fba, a color filter Fra, and a color filter Fga among the color filers 76, more specifically, light travelling toward the image PIB are blocked by the light shielding pattern 77A, the light shielding pattern 77B, and the light shielding pattern 77C, respectively. Other parts of light passing through the color filter Fba, the color filter Fra, and the color filter Fga, more specifically, light travelling toward the image PIA pass through a space between the light shielding pattern 77A and the light shielding pattern 77B, a space between the light shielding pattern 77B and the light shielding pattern 77C, and a space between the light shielding pattern 77C and the light shielding pattern 77D, respectively.

Parts of light passing through a color filter Fbb, a color filter Frb, and a color filter Fgb among the color filers 76, more specifically, light travelling toward the image PIA are blocked by the light shielding pattern 77C, the light shielding pattern 77D, and the light shielding pattern 77E, respectively. Other parts of light passing through the color filter Fbb, the color filter Frb, and the color filter Fgb, more specifically, light travelling toward the image PIB pass through a space between the light shielding pattern 77B and the light shielding pattern 77C, a space between the light shielding pattern 77C and the light shielding pattern 77D, and a space between the light shielding pattern 77D and the light shielding pattern 77E, respectively.

The light passing through the color filter Fga, the color filter Fra, and the color filter Fba corresponds to an element GA, an element RA, and an element BA of the image PIA, respectively. The light passing through the color filter Fgb, the color filter Frb, and the color filter Fbb corresponds to an element GB, an element RB, and an element BB of the image PIB, respectively. Thus, the display panel 2 can display the image PIA and the image PIB in different directions.

Image data for the image PIA is D_PIA, whereas image data for the image PIB is D_PIB. The image data D_PIA is supplied to the pixels of the pixel substrate 21A corresponding to the color filter Fba, the color filter Fra, and the color filter Fga. The image data D_PIB is supplied to the pixels corresponding to the color filter Fbb, the color filter Frb, and the color filter Fgb. The image data D_PIA may be the same as or different from the image data D_PIB.

1-3. Relation Between the Counter Substrate and the Pixel Substrate

Figure 6:
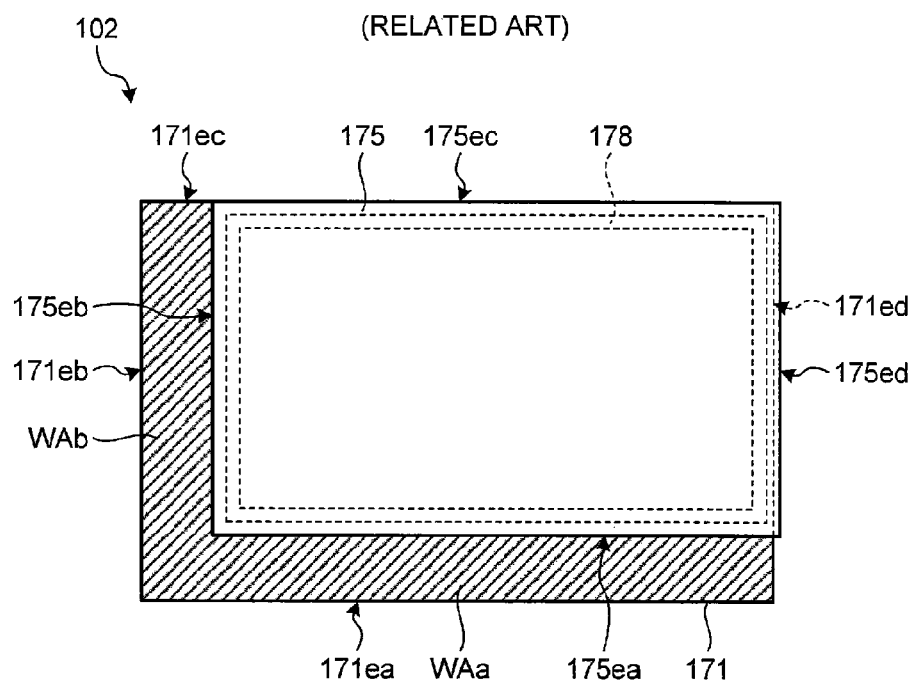
FIG. 6 is a plan view illustrating the relation between a counter substrate and a pixel substrate according to a comparative example.

FIG. 6 is a plan view illustrating the relation between a counter substrate and a pixel substrate according to a comparative example. A display panel 102 according to the comparative example has a rectangular shape in plan view, that is, when viewed from a direction orthogonal to the display surface. The display panel 102 is provided with a sealing member 178 between a TFT substrate 171 and a glass substrate 175 and on the periphery thereof.

Wirings (signal lines and scanning lines) coupled to switching elements (TFT) of pixels arranged in a matrix are led out at two portions on the TFT substrate 171 of the display panel 102. A portion WAa to which the wirings are led out is a part on an outer edge 171ea side corresponding to one of two sides adjacent to each other. A portion WAb to which the wirings are led out is a part on an outer edge 171eb side corresponding to the other of the two sides adjacent to each other.

As illustrated in FIG. 6, an outer edge 175ea and an outer edge 175eb of the glass substrate 175 are positioned inside the outer edge 171ea and the outer edge 171eb of the TFT substrate 171, that is, on the side closer to the area surrounded by the sealing member 178 at the portion WAa and the portion WAb to which the wirings of the display panel 102 are led out. An outer edge 171ec and an outer edge 171ed are portions to which no wiring is led out on the TFT substrate 171. The outer edge 171ec of the TFT substrate 171 serving as a portion to which no wiring is led out is coincident with an outer edge 175ec of the glass substrate 175 facing the portion, that is, present in the same plane. By contrast, the outer edge 171ed of the TFT substrate 171 serving as a portion to which no wiring is led out is positioned inside an outer edge 175ed of the glass substrate 175 facing the portion, that is, on the side closer to the area surrounded by the sealing member 178.

One display panel 102 is typically manufactured by: forming a plurality of portions each serving as the display panel 102 (display panel units) in a pair of large substrates (mother substrates) to obtain a display panel group; and separating each display panel unit from the display panel group. To obtain the display panel 102 by separating the display panel unit from the display panel group, processing called scribing is typically performed. Scribing is processing for forming a cut on the surface of a substrate using a tool, such as a hard roller and tip made of diamond, for example. Applying bending force along the cut formed by the scribing can divide the substrate.

Figure 7:
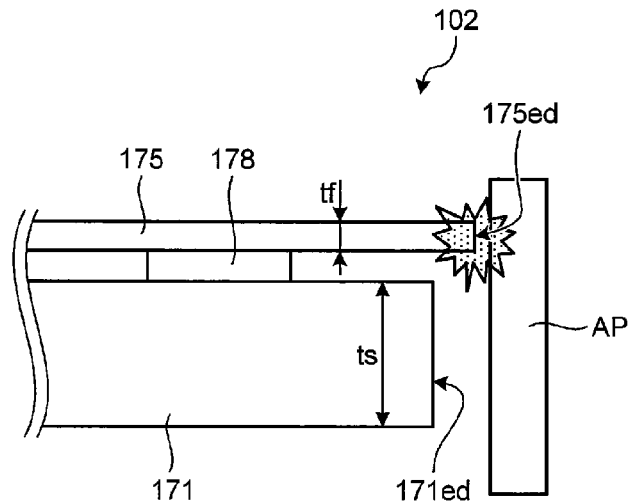
FIG. 7 is a partial sectional view illustrating the relation between the counter substrate and the pixel substrate according to the comparative example.

FIG. 7 is a partial sectional view illustrating the relation between the counter substrate and the pixel substrate according to the comparative example. As illustrated in FIG. 7, the outer edge 175ed of the glass substrate 175 facing the portion of the outer edge 171ed of the TFT substrate 171 to which no wiring is led out protrudes outside the outer edge 171ed of the TFT substrate 171. Thus, the outer edge 175ed of the glass substrate 175 protrudes outside the outer edge 171ed of the TFT substrate 171. In this case, if the display panel 102 comes into contact with a part of a processing apparatus AP or a jig as illustrated in FIG. 7 in a process after cutting out the display panel unit from the display panel group described above, for example, the outer edge 175ed of the glass substrate 175 may possibly come into contact with the processing apparatus AP or the jig first of all.

Because the display panel 102 is used for two-screen display in the present embodiment, the light shielding layer 77 needs to be provided as described above. The light shielding layer 77 provided to the glass substrate 175 has a function to divide an image in different directions. The large thickness of the glass substrate 175 reduces the parallax in the different directions. To increase the parallax in the different directions, it is necessary to decrease the thickness of the glass substrate 175. The thickness tf of the glass substrate 175 is approximately several tens of micrometers to one hundred micrometers and is smaller than thickness ts of the TFT substrate 171. If the outer edge 175ed of the glass substrate 175 protruding outside the outer edge 171ed of the TFT substrate 171 comes into contact with a part of the processing apparatus AP or the like, cracking or chipping may possibly occur in the glass substrate 175. By contrast, the outer edge 175ea and the outer edge 175eb of the glass substrate 175 are positioned inside the outer edge 171ea and the outer edge 171eb of the TFT substrate 171 at the portion WAa and the portion WAb to which the wirings of the display panel 102 are led out as illustrated in FIG. 6. If the outer edge 171ea or the outer edge 171eb of the display panel 102 comes into contact with a part of the processing apparatus AP or the like, for example, the TFT substrate 171 having a larger thickness than that of the glass substrate 175 comes into contact with the processing apparatus AP first of all. The thickness ts of the TFT substrate 171 is five to twenty times larger than the thickness tf of the glass substrate 175. Thus, if the TFT substrate 171 comes into contact with a part of the processing apparatus AP, the possibility of cracking or chipping is extremely low. Because the TFT substrate 171 comes into contact with a part of the processing apparatus AP or the like first of all, the glass substrate 175 is protected. As a result, in the display panel 102 for two-screen display, the possibility that the glass substrate 175 is cracked or chipped is extremely low at the portion WAa and the portion WAb to which the wirings of the display panel 102 are led out.

Figure 8:
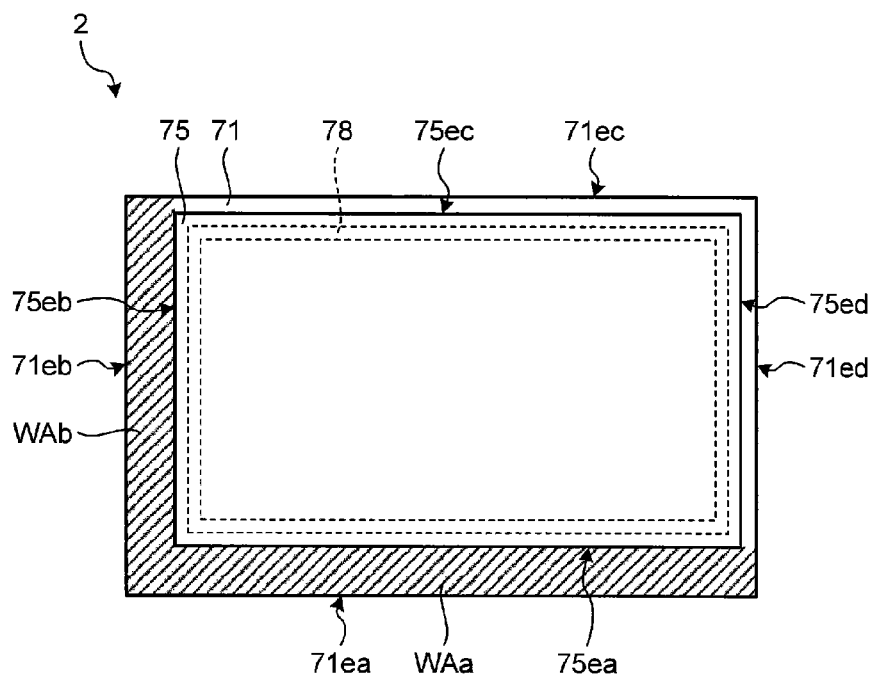
FIG. 8 is a plan view illustrating a relation between a counter substrate and a pixel substrate according to the a embodiment.
Figure 9:
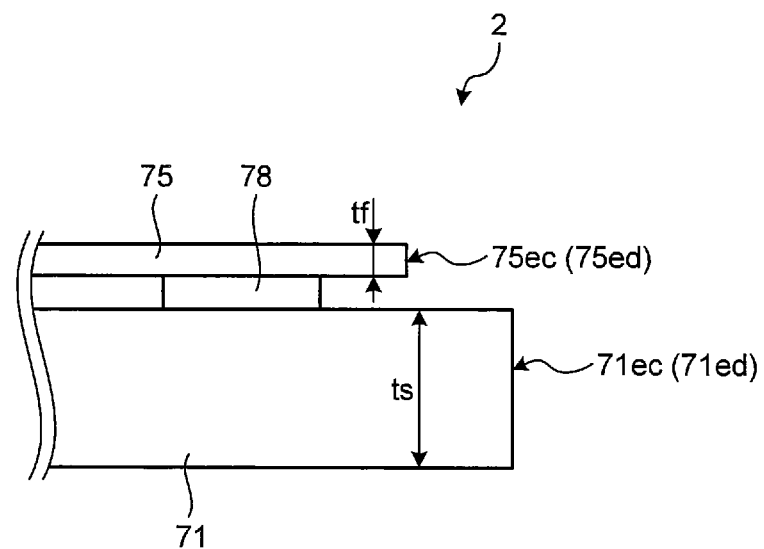
FIG. 9 is a partial sectional view illustrating the relation between the counter substrate and the pixel substrate according to the a embodiment.

FIG. 8 is a plan view illustrating the relation between the counter substrate and the pixel substrate according to the embodiment. FIG. 9 is a partial sectional view illustrating the relation between the counter substrate and the pixel substrate according to the embodiment. In the present embodiment, the display panel 2 is the same as the display panel 102 according to the comparative example except for the structure of the glass substrate 75 at a portion other than the portion WAa and the portion WAb to which the wirings are led out. The following mainly describes parts of the display panel 2 different from those of the display panel 102, and explanation of parts in common will not be repeated.

As illustrated in FIG. 8 and FIG. 9, an outer edge 75ec and an outer edge 75ed of the glass substrate 75 facing a portion of the TFT substrate 71 to which no wiring of the display panel 2 is led out, that is, facing an outer edge 71ec and an outer edge 71ed are positioned inside the outer edge 71ec and the outer edge 71ed of the TFT substrate 71. In other words, the outer edge 75ec and the outer edge 75ed of the glass substrate 75 are positioned on the side closer to the area surrounded by a sealing member 78 than the outer edge 71ec and the outer edge 71ed of the TFT substrate 71. Because the display panel 2 is used for two-screen display, thickness tf of the glass substrate 75 is smaller than thickness ts of the TFT substrate 71. In the present embodiment, the thickness tf is one-twentieth to one-fifth of the thickness ts.

With this configuration, the TFT substrate 71 having a larger thickness is arranged outside the glass substrate 75 around the entire periphery of the display panel 2. If the display panel 2 comes into contact with a part of the processing apparatus AP or the like in the manufacturing process of the display panel 2, for example, the TFT substrate 71 having a larger thickness comes into contact with a part of the processing apparatus AP or the like first of all. This can significantly reduce the possibility that the glass substrate 75 having a smaller thickness comes into contact with a part of the processing apparatus AP or the like, thereby significantly reducing the possibility that the glass substrate 75 is cracked or chipped. Because the TFT substrate 71 has a larger thickness, the possibility of cracking or chipping is extremely low if the TFT substrate 71 comes into contact with a part of the processing apparatus AP or the like. As described above, the TFT substrate 71 and the glass substrate 75 are extremely unlikely to be cracked or chipped in the manufacturing process of the display panel 2, thereby improving the yield and the quality.

1-4. Method for Manufacturing the Display Device

Figure 10:
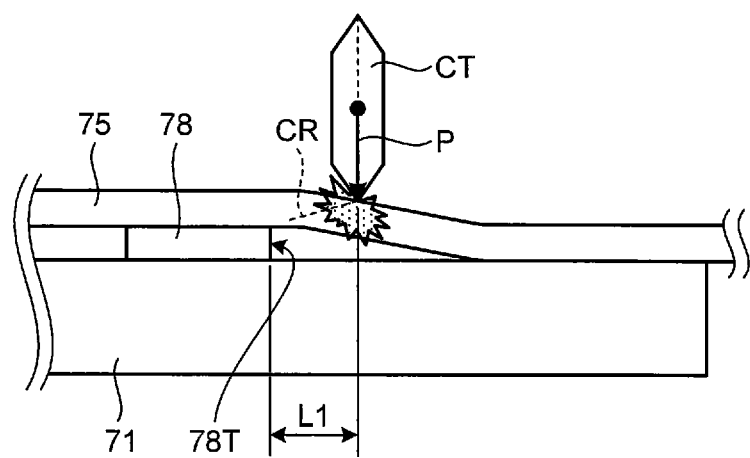
FIG. 10 is a view for explaining a position at which a glass substrate is divided.
Figure 11:
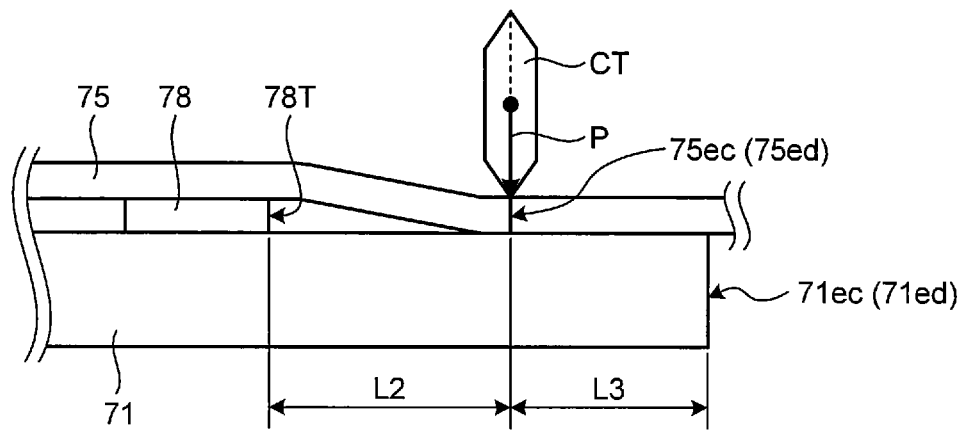
FIG. 11 is a view for explaining another position at which the glass substrate is divided.

FIG. 10 and FIG. 11 are views for explaining a position at which the glass substrate is divided. As illustrated in FIG. 10, the glass substrate 75 is scribed and divided at a position away from an outer edge 78T of the sealing member 78 by a distance L1. If the distance L1 is set small as illustrated in FIG. 10, pressing force P by a scribing tool CT significantly bends the glass substrate 75. This may possibly cause a crack CR in the glass substrate 75 in scribing.

To address this, the glass substrate 75 is preferably scribed at a position away from the outer edge 78T of the sealing member 78 by a distance L2 larger than the distance L1 as illustrated in FIG. 11. The distance L2 is a length that can make the deflection of the glass substrate 75 caused by the pressing force P of the scribing tool CT small enough to prevent a crack or the like in the glass substrate 75, thereby dividing the glass substrate 75 appropriately. Moreover, the position at which the glass substrate 75 is scribed is away from the outer edge 71ec (outer edge 71ed) of the TFT substrate 71 by a distance L3. The distance L3 is preferably set to a length that prevents the outer edge 75ec (outer edge 75ed) of the glass substrate 75 from protruding outside the outer edge 71ec (outer edge 71ed) of the TFT substrate 71 because of accuracy and a burr occurring when both the glass substrate 75 and the TFT substrate 71 are divided. Setting the distance L2 and the distance L3 in this manner enables the outer edges 75ec and 75ed of the glass substrate 75 to be reliably arranged inside the outer edge 71ec and the outer edge 71ed of the TFT substrate 71 at the portion other than the portion WAa and the portion WAb to which the wirings are led out on the TFT substrate 71.

In the present embodiment, the distance L2 is larger than the distance L3 at the portion to which no wiring is led out on the TFT substrate 71. The distance L2 is a length from the sealing member 78 to the outer edge 75ec or the outer edge 75ed of the glass substrate 75. The distance L3 is a length from the outer edge 75ec and the outer edge 75ed of the glass substrate 75 to the outer edge 71ec and the outer edge 71ed of the TFT substrate 71, respectively. This facilitates securement of the distance L2 from the sealing member 78 to the position at which the glass substrate 75 is scribed. As a result, it is possible to facilitate suppression of a crack or the like occurring in the glass substrate 75 in scribing.

Figure 12:
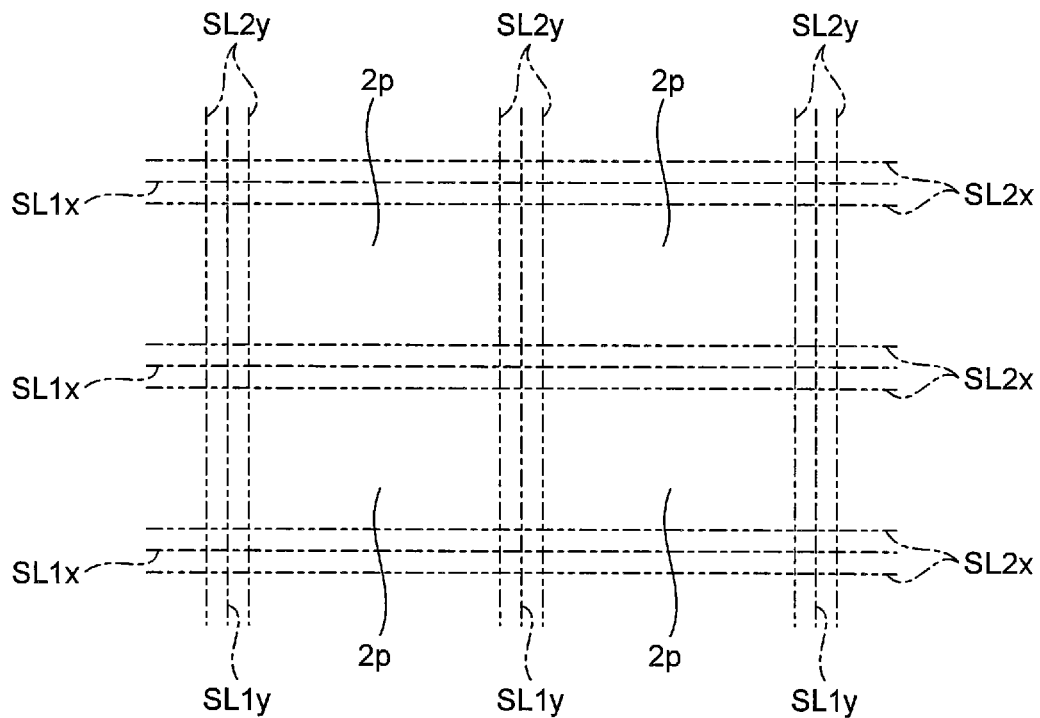
FIG. 12 is a plan view for explaining a position and an order of scribing to divide the glass substrate and a TFT substrate.

FIG. 12 is a plan view for explaining a position and an order of scribing to divide the glass substrate and the TFT substrate. To divide the large TFT substrate 71 (pixel substrate 21A) and glass substrate 75 (counter substrate 213) on which a plurality of display panels 2P are formed, that is, to divide a display panel group, the glass substrate 75 is scribed to form a cut thereon first, and then the TFT substrate 71 is scribed to form a cut thereon. The glass substrate 75 is scribed on the periphery of the display panel 2, more specifically, at two positions sandwiching the position corresponding to the outer edge of the TFT substrate 71. The scribing forms cuts SL2x and cuts SL2y on the surface of the glass substrate 75. Subsequently, the TFT substrate 71 is scribed between the cuts SL2x adjacent to each other and between the cuts SL2y adjacent to each other in plan view. The scribing forms cuts SL1x and cuts SL1y on the surface of the TFT substrate 71.

The glass substrate 75 is scribed on the surface opposite to the surface facing the TFT substrate 71. The TFT substrate 71 is scribed on the surface opposite to the surface facing the glass substrate 75. In other words, the glass substrate 75 and the TFT substrate 71 are scribed on the surfaces opposite to the surfaces facing each other by the tool CT illustrated in FIG. 10 and FIG. 11.

After the scribing is finished, the large TFT substrate 71 and glass substrate 75 are cut along the cuts SL1x, the cuts SL1y, the cuts SL2x, and the cuts SL2y for each display panel unit 2P and divided into a plurality of display panels 2. After the display panel 2 is obtained, the vertical drive circuit 22, the horizontal drive circuit 23, the driver IC 3, and other components illustrated in FIG. 2 are mounted on the TFT substrate 71, thereby completing the display device 1. With this process, it is possible to manufacture the display panel 2 and the display device 1 including the same according to the present embodiment.

2. Electronic Apparatuses

The display device 1 according to the present disclosure is applicable to display units (display devices) of electronic apparatuses of all fields that display video signals received by the electronic apparatuses or video signals generated inside thereof as an image or video. The following describes specific examples of an electronic apparatus provided with a display unit to which the display device 1 is applied, that is, an electronic apparatus according to the present disclosure.

First Application Example

Figure 13:
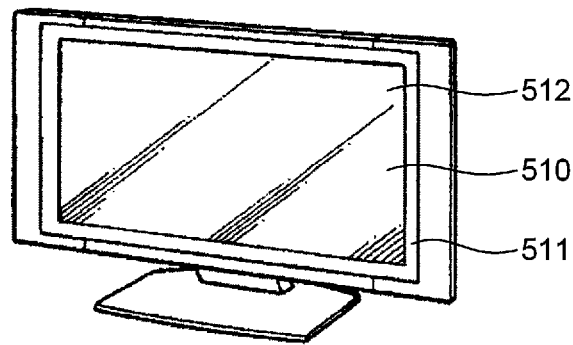
FIG. 13 is a perspective view of an appearance of a television apparatus to which the display device according to the embodiment is applied.

An electronic apparatus illustrated in FIG. 13 is a television apparatus to which the display device 1 is applied. The television apparatus has a video display screen 510 including a front panel 511 and a filter glass 512, for example. The display device 1 is applied to the video display screen 510. The screen of the television apparatus may have a function to detect a touch operation besides a function to display an image.

Second Application Example

Figure 14:
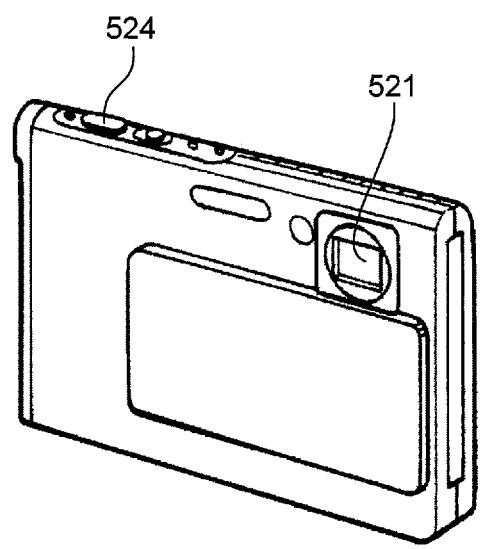
FIG. 14 is a perspective view of an appearance of a digital camera to which the display device according to the embodiment is applied.
Figure 15:
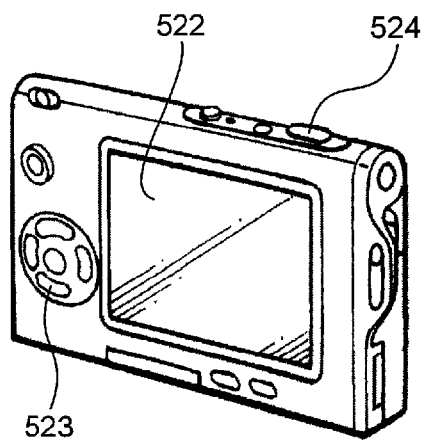
FIG. 15 is another perspective view of the appearance of the digital camera to which the display device according to the embodiment is applied.

An electronic apparatus illustrated in FIG. 14 and FIG. 15 is a digital camera to which the display device 1 is applied. The digital camera includes a light-emitting unit 521 for flash, a display unit 522, a menu switch 523, and a shutter button 524, for example. The display device 1 is applied to the display unit 522. The display unit 522 of the digital camera may have a function to detect a touch operation besides a function to display an image.

Third Application Example

Figure 16:
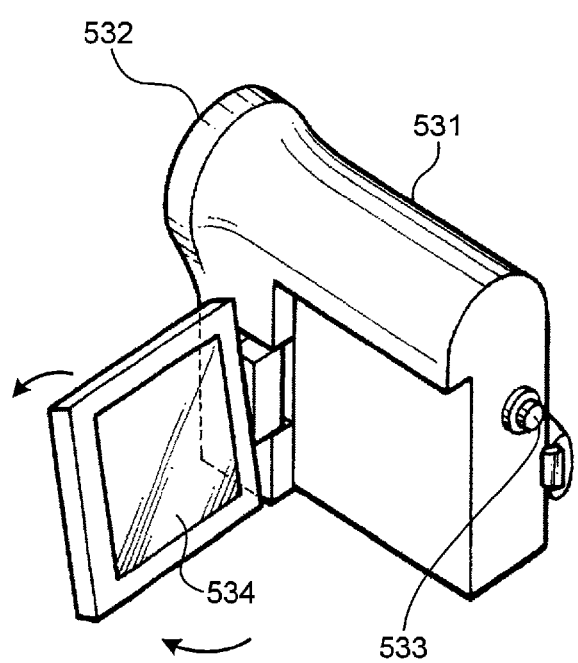
FIG. 16 is a perspective view of an appearance of a video camera to which the display device according to the embodiment is applied.

An electronic apparatus illustrated in FIG. 16 is a video camera to which the display device 1 is applied. The video camera includes a main body 531, a lens 532 provided to the front side surface of the main body 531 to photograph a subject, a start/stop switch 533 used in photographing, and a display unit 534, for example. The display device 1 is applied to the display unit 534. The display unit 534 of the video camera may have a function to detect a touch operation besides a function to display an image.

Fourth Application Example

Figure 17:
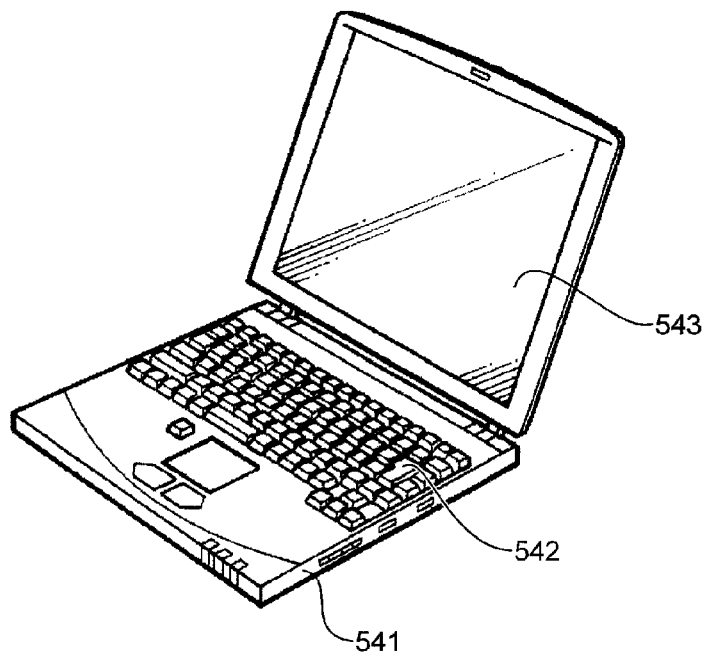
FIG. 17 is a perspective view of an appearance of a notebook personal computer to which the display device according to the embodiment is applied.

An electronic apparatus illustrated in FIG. 17 is a notebook personal computer to which the display device 1 is applied. The notebook personal computer includes a main body 541, a keyboard 542 used for an input operation of characters, and a display unit 543 that displays an image, for example. The display device 1 is applied to the display unit 543. The display unit 543 of the notebook personal computer may have a function to detect a touch operation besides a function to display an image.

Fifth Application Example

Figure 18:
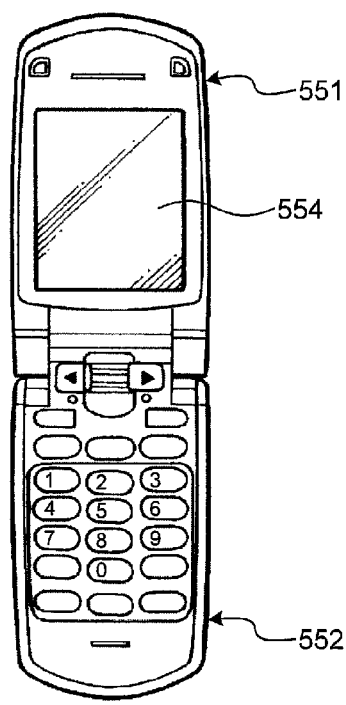
FIG. 18 is a front view of a mobile phone to which the display device according to the embodiment is applied in an unfolded state.
Figure 19:
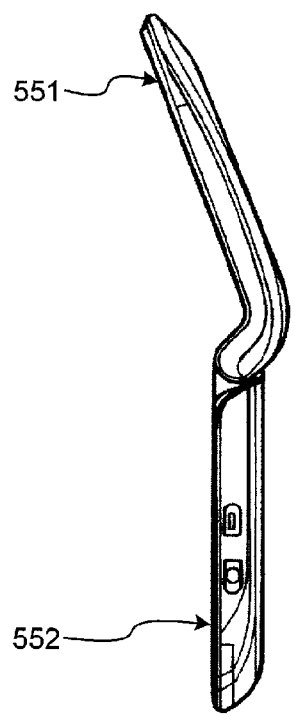
FIG. 19 is a side view of the mobile phone to which the display device according to the embodiment is applied.
Figure 20:
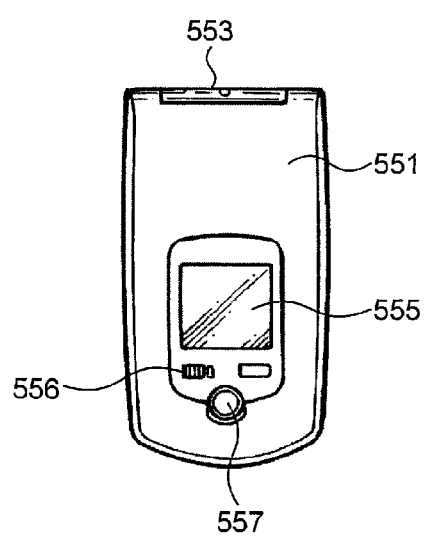
FIG. 20 is a front view of the mobile phone to which the display device according to the embodiment is applied in a folded state.
Figure 21:
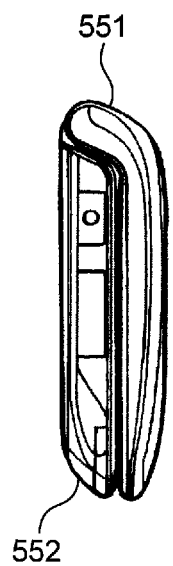
FIG. 21 is a left side view of the mobile phone to which the display device according to the embodiment is applied.
Figure 22:
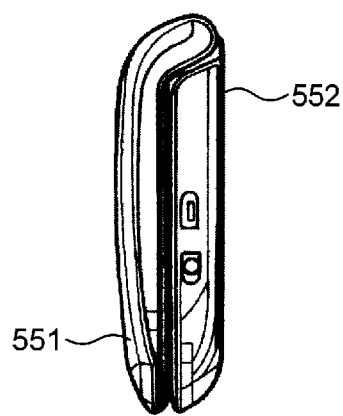
FIG. 22 is a right side view of the mobile phone to which the display device according to the embodiment is applied.
Figure 23:
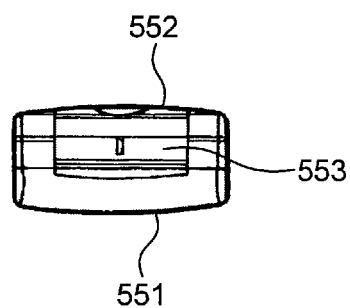
FIG. 23 is a top view of the mobile phone to which the display device according to the embodiment is applied.
Figure 24:
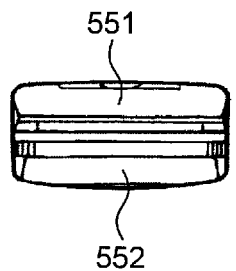
FIG. 24 is a bottom view of the mobile phone to which the display device according to the embodiment is applied.

An electronic apparatus illustrated in FIG. 18 to FIG. 24 is a mobile phone to which the display device 1 is applied. FIG. 18 is a front view of the mobile phone in an unfolded state. FIG. 19 is a right side view of the mobile phone in the unfolded state. FIG. 20 is a front view of the mobile phone in a folded state. FIG. 21 is a left side view of the mobile phone in the folded state. FIG. 22 is a right side view of the mobile phone in the folded state. FIG. 23 is a top view of the mobile phone in the folded state. FIG. 24 is a back view of the mobile phone in the folded state. The mobile phone is formed of an upper housing 551 and a lower housing 552 connected by a connection (a hinge) 553. The mobile phone includes a display 554, a sub-display 555, a picture light 556, and a camera 557, for example. The display device 1 is provided as the display 554. The display unit 554 of the mobile phone may have a function to detect a touch operation besides a function to display an image.

Sixth Application Example

Figure 25:
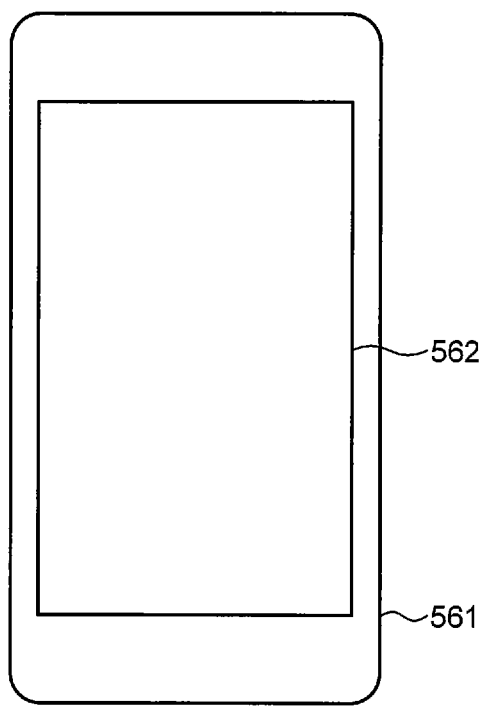
FIG. 25 is a front view of a smartphone to which the display device according to the embodiment is applied.

An electronic apparatus illustrated in FIG. 25 operates as a mobile computer, a multifunctional mobile phone, a mobile computer capable of making a voice call, or a mobile computer capable of performing communications. The electronic apparatus is a portable information terminal, which may be called a smartphone or a tablet terminal. The portable information terminal is provided with a display unit 562 on the surface of a housing 561, for example. The display unit 562 corresponds to the display device 1.

3. Aspects of the Present Disclosure

The present disclosure includes aspects as follows.

(1) A Display Device Comprising:

a first substrate that is a plate-like member and is provided with a switching element for each of pixels arranged in a matrix and a wiring coupled to the switching element;

a second substrate that is a plate-like member facing the first substrate and having a smaller thickness than the thickness of the first substrate, the second substrate having an outer edge that faces a portion of the first substrate to which the wiring is not led out and that is positioned inside an outer edge of the first substrate when viewed from a direction orthogonal to a substrate surface of the first substrate; and a light shielding layer that is provided to a surface of the second substrate opposite to the first substrate and that divides an image displayed by the pixels by blocking a part of light from the second substrate.

(2) The display device according (1), further comprising:

a sealing member arranged between the first substrate and the second substrate and on a periphery of the first substrate and the second substrate, wherein a distance from the sealing member to the outer edge of the second substrate is larger than a distance from the outer edge of the second substrate to the outer edge of the first substrate at the portion of the first substrate to which the wiring is not led out.

(3) The display device according to (1), wherein the thickness of the second substrate is one-twentieth to one-fifth of the thickness of the first substrate.

(4) An electronic apparatus comprising the display device according to (1).

(5) A method for manufacturing a display device, the method comprising:

forming cuts for separating a plurality of display panel units from a display panel group in which the display panel units are formed on a first substrate and a second substrate facing the first substrate and having a thickness of one-twentieth to one-fifth of the thickness of the first substrate; and dividing the display panel group along the first and the second cuts, wherein the forming cuts includes forming first cuts at two positions sandwiching a position corresponding to an outer edge of the display panel on a surface of the second substrate, and forming a second cut between the first cuts adjacent to each other on a surface of the first substrate in plan view.

According to the present disclosure, the first substrate having a larger thickness is arranged outside the second substrate, that is, outside the substrate on the color filter side around the entire periphery of the display device. If the display device comes into contact with a part of a jig or a processing apparatus in the manufacturing process of the display device, for example, the first substrate having a larger thickness comes into contact with a part of the jig or the like first. This can significantly reduce the possibility that the second substrate having a smaller thickness comes into contact with a part of the jig or the like, thereby significantly reducing the possibility that the substrate on the color filter side is cracked or chipped.

The present disclosure can suppress cracking or chipping of the substrate on the color filter side included in the display device.

What is claimed is:

1. A display device comprising:

a first substrate that is a plate-like member and is provided with a switching element for each of pixels arranged in a matrix and a wiring coupled to the switching element;

a second substrate that is a plate-like member facing the first substrate and having a smaller thickness than the thickness of the first substrate, the second substrate having an outer edge that faces a portion of the first substrate to which the wiring is not led out and that is positioned inside an outer edge of the first substrate when viewed from a direction orthogonal to a substrate surface of the first substrate; and a light shielding layer that is provided to a surface of the second substrate opposite to the first substrate and that divides an image displayed by the pixels by blocking a part of light from the second substrate.

2. The display device according to claim 1, further comprising:

a sealing member arranged between the first substrate and the second substrate and on a periphery of the first substrate and the second substrate, wherein a distance from the sealing member to the outer edge of the second substrate is larger than a distance from the outer edge of the second substrate to the outer edge of the first substrate at the portion of the first substrate to which the wiring is not led out.

3. The display device according to claim 1, wherein the thickness of the second substrate is one-twentieth to one-fifth of the thickness of the first substrate.

4. An electronic apparatus comprising the display device according to claim 1.

5. A method for manufacturing a display device, the method comprising:

forming cuts for separating a plurality of display panel units from a display panel group in which the display panel units are formed on a first substrate and a second substrate facing the first substrate and having a thickness of one-twentieth to one-fifth of the thickness of the first substrate; and dividing the display panel group along the first and the second cuts, wherein the forming cuts includes forming first cuts at two positions sandwiching a position corresponding to an outer edge of the display panel on a surface of the second substrate, and forming a second cut between the first cuts adjacent to each other on a surface of the first substrate in plan view.

* * * * *